No. 733,158. PATENTED JULY 7, 1903.
J. A. COLLET.
VEHICLE TIRE.
APPLICATION FILED NOV. 15, 1902.
NO MODEL. 3 SHEETS—SHEET 3.
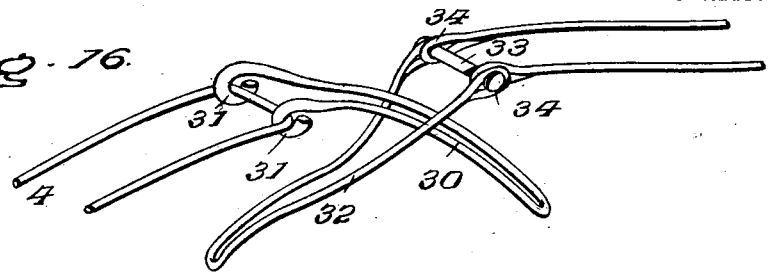
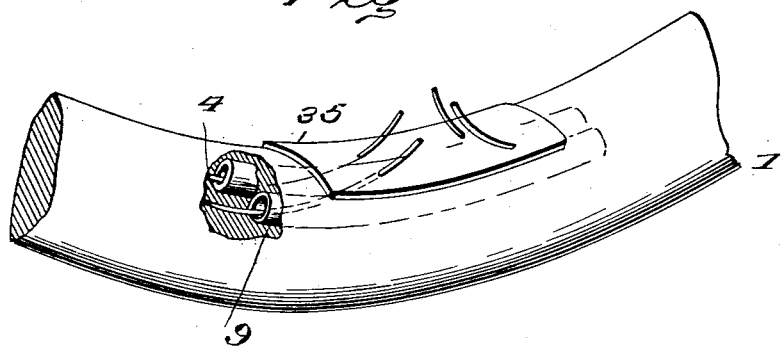
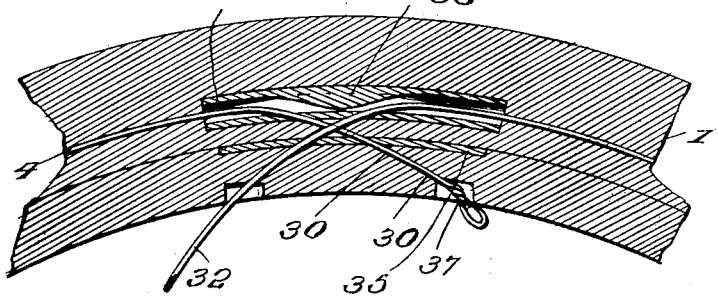
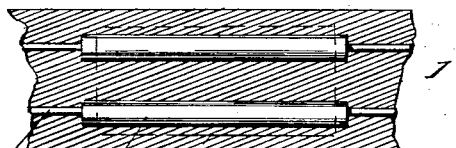
WITNESSES:
INVENTOR
J. A. Collet
BY
Attorneys No. 733,158. Patented July 7, 1903.

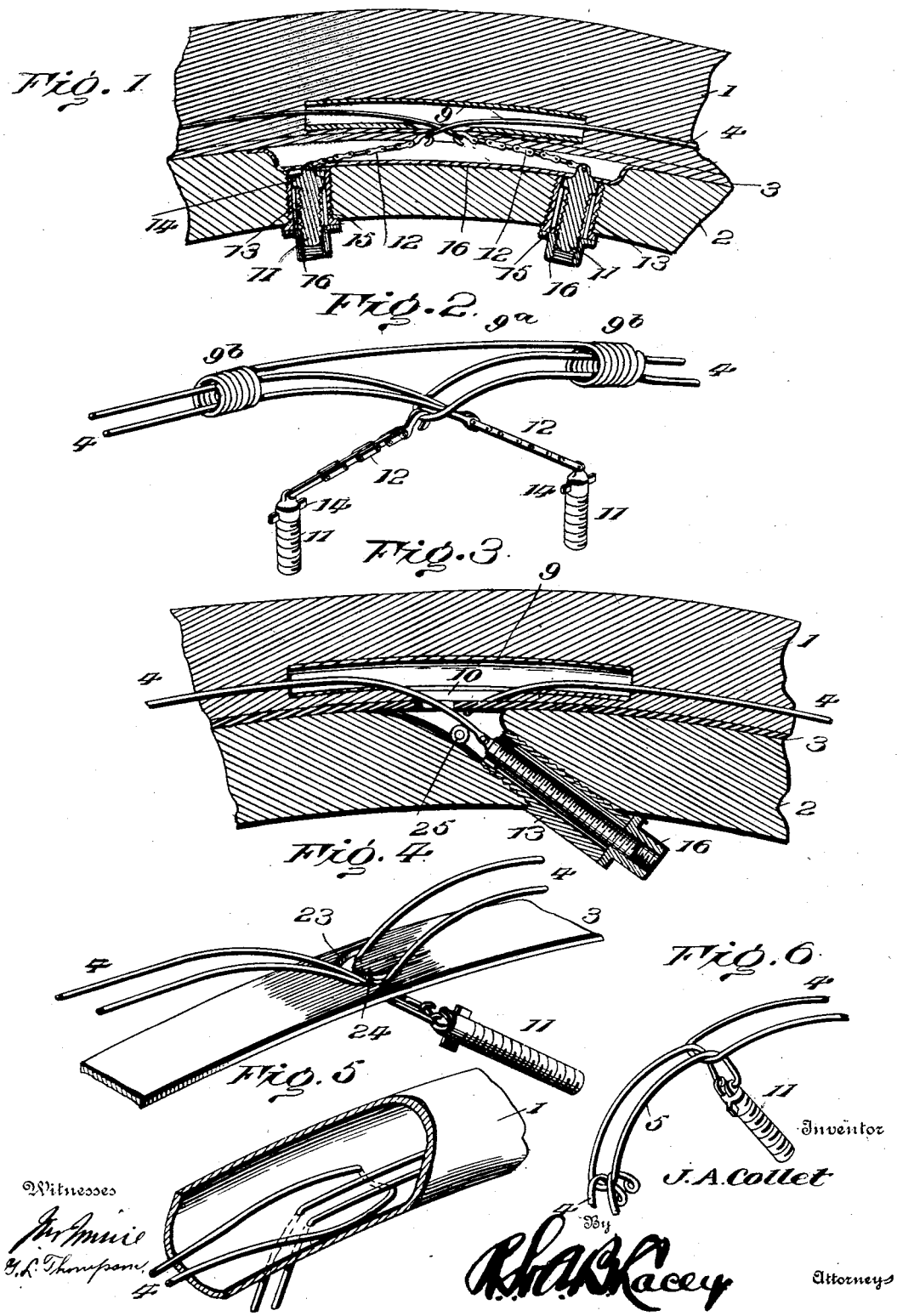

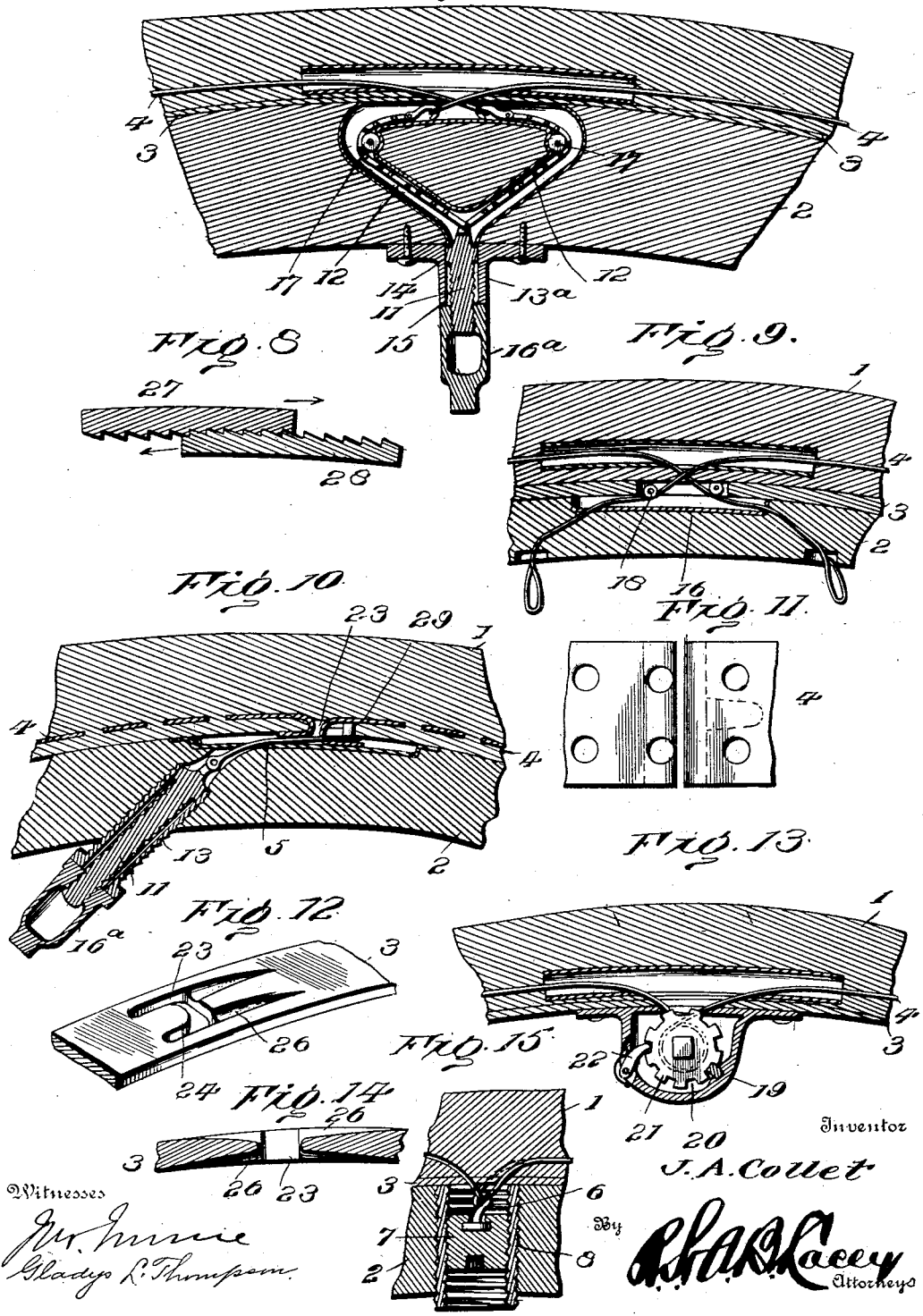

UNITED STATES PATENT OFFICE.

JULES A. COLLET, OF BROOKLYN, NEW YORK.

VEHICLE-TIRE.

SPECIFICATION forming part of Letters Patent No. 733,158, dated July 7, 1903.

Application filed November 15, 1902. Serial No. 131,587. (No model.)

*To all whom it may concern:*

Be it known that I, JULES A. COLLET, a citizen of the United States, residing at Brooklyn, in the county of Kings and State of New York, have invented certain new and useful Improvements in Vehicle-Tires; and I do hereby declare the following to be a full, clear, and exact description of the invention, such as will enable others skilled in the art to which it appertains to make and use the same.

This invention relates to the variety of soft tires in which a binder is embedded for drawing the tire about the rim of the wheel and securing it thereto, the ends of the binder crossing or coming close together, so as to be engaged by a tie. In either form the tire is weakened at the point opposite the ends of the binder.

An essential feature of the present invention is to stiffen, reinforce, and support the tire opposite the ends of the binder, whereby the life of the tire is prolonged and its smooth running maintained until the end.

The provision of the tie is important, since it enables the tire to be removed and again replaced without injury to the binder, particularly in cases where the ends of the wire are twisted together to effect the securement of the tire.

The improvement further consists of the novel features, details of construction, and combinations of parts, which hereinafter will be more fully described and claimed, and which are shown in the annexed drawings, in which—

Figure 1 is a longitudinal sectional detail of a portion of a tire and vehicle-rim, showing the application of the invention. Fig. 2 is a detail perspective view showing a modified form of reinforcement and the contiguous ends of a binder and the straining means therefor conjunctively related. Fig. 3 is a view similar to Fig. 1, showing a modification. Fig. 4 is a detail perspective view showing a modification of the securing means for the binder. Fig. 5 is a detail perspective view showing a different arrangement of the binder. Fig. 6 is a detail perspective view showing a tie as the connecting means between the terminals of the binder. Fig. 7 is a view similar to Fig. 1, showing a single straining device in coöperation with the binder. Fig. 8 is a detail view of means for securing the ends of the binder and preventing their accidental disengagement during the operation of the straining device. Fig. 9 is a view similar to Fig. 1, showing a modification. Fig. 10 is a view similar to Fig. 3, showing a flat binder and a tie coöperating therewith. Fig. 11 is a plan view of the terminal portions of the flat binder embodied in the construction illustrated in Fig. 10. Fig. 12 is a detail view in perspective of one form of irons for the rim of a vehicle-wheel. Fig. 13 is a view similar to Fig. 1, showing a drum for drawing the ends of the binder together. Fig. 14 is a longitudinal section of a modified form of iron for a vehicle-wheel rim. Fig. 15 shows a different form of straining device, consisting of a screw-plug, internally-threaded sleeve, and a hook having a swivel connection with the screw-plug. Fig. 16 is a perspective view of a modified form of connection for the ends of the binder. Fig. 17 is a detail perspective view of a further modification, showing two tubes located within the tire and a plate fitted to the rim side of said tire. Fig. 18 is a detail view in section, showing the tube reinforced intermediate of its ends. Fig. 19 is a detail view showing a pair of tubes located within the tire.

Corresponding and like parts are referred to in the following description and indicated in all the views of the drawings by the same reference characters.

The tire is indicated by the reference-numeral 1, the rim of the vehicle-wheel by the numeral 2, and the iron encircling the vehicle-rim by the numeral 3. The tire is of soft material, such as rubber, and may be solid, cushion, pneumatic, or of any type providing a soft tread and has embedded therein a binder 4, which may be a wire or a flat strip of metal. In the latter case the strip is perforated, as shown most clearly in Figs. 10 and 11, to admit of the parts of the tire lying upon opposite sides of the strip being connected at intervals, so as to form a firm and substantial bond. The end portions of the binder may cross, as shown in Figs. 1, 2, 3, 4, 5, 7, 9, and 13, or may come close together, as illustrated in Figs. 6, 10, and 15. Where the end portions of the binder cross, the straining device may be applied directly thereto; but where the ends come close together it is necessary to employ a tie, as shown at 5 in Figs. 6 and 10, or to unite them by means of a hook 6, having a swivel connection with a screw-plug 7, fitted in an internally-threaded sleeve 8, secured in an opening of the rim 2, as indicated in Fig. 15. The binder 4 may be applied to the tire either during the process of formation or subsequent thereto and is unimportant so far as the novelty of the invention is concerned. In all the various forms the tire is weakened at the point where the terminals or end portions of the binder come together or connect with the straining device and for this reason is liable to give away and cause jolt every time this part of the tire comes in contact with the surface over which the vehicle is moving. As an offset to this objectionable feature the present invention provides a reinforcement, which is embedded in the tire at the weak point. This reinforcement may be variously formed and in the preferable construction consists of a tube 9, embedded within the tire and having a slot 10 in its inner side midway of its extremities for the passage of the end portions of the binder. This reinforcement strengthens the tire and supports the same opposite the opening through which the straining device has connection with the binder. In the form shown in Fig. 2 the reinforcement consists of a stout wire 9$^a$, having its end portions formed into coils 9$^b$, the part 9$^a$ bridging the depression formed by the crossing of the end portions of the binder 4.

The straining device may be provided in a variety of ways and differently applied and may be single or in duplicate. As shown in Figs. 1 and 2, exteriorly-threaded pins 11 are joined by flexible connections 12 with the terminals of the binder 4 and are mounted in sleeves 13, let into openings formed in the rim 2, and these pins are prevented from turning by opposite extensions 14, working in guide-grooves 15, formed in opposite sides of the sleeves 13. Set-nuts 16 coöperate with the threaded pins to effect a movement thereof in the sleeves to draw the binder tight around the rim of the vehicle-wheel. As shown in Fig. 1, a recess is formed in the outer side of the rim 2 and receives a box 16, which receives the flexible connections 12, the outer side of the box being closed by the iron 3.

In the form shown in Fig. 7 the flexible connections 12 have attachment with a single pin 11, slidably mounted in a sleeve 13$^a$, attached to the inner side of the rim 2, the set-nut 16$^a$ being of the cap variety, so as to conceal the end of the threaded pin and prevent dirt and foreign matter finding entrance thereto. In this construction it is necessary to have the flexible connections 12 outwardly diverged at their inner ends and inwardly deflected at their outer ends in order to effect a straining of the binder when operating the set-nut 16$^a$ to produce an inward movement of the pin 11. In order that the flexible connections 12 may move easily at their point of deflection, rollers 17 are provided and located at the ends of the portion of the rim 2, around which the connections 12 pass.

Fig. 9 illustrates a construction in which the ends of the binder 4 after crossing pass over guide-pulleys 18, thence through openings in the box 16 and openings in the rim 2 in communication therewith, the projecting ends of the binder being adapted to receive any form of straining device that may be selected or best adapted for the particular style or pattern of wheel to which the invention may be applied.

In Fig. 13 a box 19 is applied to the inner side of the iron 3, which may constitute the rim proper, and within this box is located a drum 20, provided with the usual ratchet-wheel 21 and pawl 22 to prevent backward rotation of the drum. The end portions of the binder 4 are attached to the drum 20 and are adapted to be wound thereon when straining the binder to secure the tire and draw it close about the rim of the vehicle-wheel.

As shown in Figs. 3, 4, and 12, the iron 3 has an opening 23 of crescent or other shape, so as to provide a tongue 24 for direct and positive connection with the binder 4, the opposite end of the binder passing through the opening 23 and having connection with a threaded pin 11, mounted in a sleeve 13 and coöperating with a set-nut 16 in the manner previously described for effecting a straining of the binder. In this instance the sleeve and pin have an oblong arrangement to produce a straining of the binder with a minimum amount of friction. A guide-roller 25 is located at the outer end of the opening in which the sleeve 13 is fitted for the movable end portion of the binder 4 to pass through, thereby easing the movement of the same.

In the form shown in Fig. 5 an end portion of the binder passes through the opposite looped end of the binder, thence through openings in the tire, and is adapted for coöperation with a straining device of any type. This arrangement is best adapted for the securement of pneumatic tires to the rim of a wheel. In order that the binder may be deflected the smallest amount possible when passing from one side of the iron to the other, a groove or grooves 26 are provided in opposite sides of the iron and extend from the opening 23 and taper as they recede from said opening. This enables the binder to be drawn in a direct line and with a minimum amount of friction and resistance and is an offset to fracture which would be liable to occur if the end portions of the binder were passed abruptly over the corners bordering upon the opening 23. It is contemplated to apply to the end portions of the binder toothed plates or bars 27 and 28, the same being attached to the end portions of the binder in any desired way. Opposing or adjacent sides of the parts 27 and 28 are toothed, one face of the teeth being inclined and the other face forming an abrupt shoulder, the shoulders interlocking to prevent slipping of the parts should they become free from the straining device from any cause. The inclined faces of the teeth are adapted to ride freely upon each other to admit of the tightening of the binder under the action of the straining device.

In some cases it is preferable to secure the ends of the binder by a tie, as 5, which consists of a short length of wire arranged either to connect the ends of the binder, as shown in Fig. 6, or having attachment with one end only, as shown in Fig. 10, one end of the tie being connected to the threaded pins 11 of the straining device. The tie 5 being subjected to the greatest strain is most liable to fracture and can be replaced at a nominal cost; hence the desirability of its employment.

In the construction shown in Fig. 10 one end of the binder 4 is engaged with a side of the opening 23 and the opposite end is bent, a stud 29 connecting the bent end with the body of the binder and receiving an end of the tie 5. In this form the binder is a flat strip and the tie is a wire. The straining device may be applied to the rim or to the iron and may be arranged obliquely to or in coincidence with a radius of the wheel, according to the caprice of the manufacturer and the type and pattern of wheel to which the invention is applied.

In the construction shown in Fig. 16 a loop 30 is fitted to the closed or folded end of the binder 4, the ends of the side members of the loop being thickened and formed into hooks 31 to embrace the folded end of the binder. A companion loop 32 has its side members connected to the terminals of the binder 4 by means of a pin or bolt 33, which passes through eyes 34, formed at the ends of the side members of the loop and the extremities of the binder, the eyes being formed by bending end portions of the parts 32 and 4 and welding the folded parts.

Figs. 17 and 19 show two tubes embedded in the tire 1, this being of advantage for heavy work and tires of broad tread. A plate 35 is applied to the rim side of the tire and has openings near its ends for the passage of the end portions of the binder or the connections applied thereto. The plate 35 is adapted to enter a depression formed in the outer side of the rim. In the event of the rim being of wood its outer side is mortised to snugly receive the tie 5; but in the event of the rim being of metal the depression is formed by pressing a part of the rim inward, as will be readily comprehended.

The tube 9, as shown in Fig. 18, is reinforced at a central point, as indicated at 36, and openings are formed in its end portions for the passage therethrough of either the end portions of the binder or the connections 30 and 32.

In Fig. 18 the connection 30 is shown as having the end portion extended beyond the inner side of the rim twisted together about a pin 37. Obviously the projecting end of the part 30 may be drawn taut and secured in any convenient way.

Having thus described the invention, what is claimed as new is—

1. In a vehicle-wheel, and in combination with a soft tire, and a binder embedded therein and adapted to have a straining device coöperate therewith, a reinforcement embedded in the tire, and having a portion overlapping the adjacent end portions of the binder, spanning the space formed between them and coming between said end portions and the tread of the tire, substantially as set forth.

2. In combination with a soft tire, a binder embedded therein and adapted to have its ends coöperate with a straining device, a reinforcement arranged within the tire and consisting of an intermediate part to span the depression or gap formed at the juncture of the end portions of the binder, and tubular end portions for the reception of the end portions of the binder which pass therethrough, substantially as set forth.

3. A soft tire having a tube embedded therein, and a binder arranged within the tire with its end portions inserted into the end portions of the said tube, the latter forming a support and a reinforcement for the tire, substantially as set forth.

4. A soft tire, in combination with a tube embedded therein and having an opening in its inner side about midway of its terminals, a binder embedded in the tire and having its end portions inserted into the end portions of the tube, and a straining device having connection with the binder through the opening in the aforesaid tube, substantially as set forth.

5. In combination with a soft tire, a binder embedded therein, a straining device consisting of a sleeve having oppositely-disposed guide-grooves, an exteriorly-threaded pin having extensions operating in the guide-grooves of the sleeve, and a set-nut conjunctively related to the said pin to effect a longitudinal movement thereof, substantially as set forth.

6. In a vehicle-wheel, the combination with the rim-iron having an opening with a projection at one end, a soft tire fitted to the iron, a binder embedded in the tire and having one end fitted to the projection at one end of the aforesaid opening and having its opposite end passing through the opening, and a straining device applied to the free end of the binder, substantially as set forth.

In testimony whereof I affix my signature in presence of two witnesses.

JULES A. COLLET. [L. S.]

Witnesses:
AUGUSTUS W. WEINGARDT,
HENRY S. VOGT.